Patented July 11, 1933

1,917,725

UNITED STATES PATENT OFFICE

NILS ERIK LENANDER, OF LOKKEN VERK, NORWAY, ASSIGNOR TO PATENTAKTIE-BOLAGET GRÖNDAL-RAMÉN, OF STOCKHOLM, SWEDEN

CONDENSATION OF SULPHUR ARSENIC COMPOUNDS

No Drawing. Application filed July 26, 1930, Serial No. 471,098, and in Sweden April 30, 1930.

This invention relates to the condensation of sulphur arsenic compounds from a gas mixture containing the same, and has for its object the provision of certain improvements in the condensation of sulphur arsenic compounds from such a gas mixture. More particularly, the invention aims to effect the condensation of the sulphur arsenic compounds in the form of a powder. A further object of the invention is to obtain a non-poisonous sulphur arsenic product, free from the poisonous arsenic trioxide.

In the smelting of sulphide ores containing arsenic in a blast or shaft furnace, where the atmosphere in the upper part of the furnace is neutral or reducing, the arsenic together with the sulphur of the ore escape with the furnace gases as a volatile sulphur arsenic compound. If the top of the furnace is closed to exclude atmospheric air while permitting charging, the furnace gases may be withdrawn without oxidation and the sulphur and arsenic recovered therefrom as sulphur arsenic compounds containing varying relative amounts of arsenic and sulphur. If the arsenic sulphides (sulphur arsenic compounds) were alone present in the furnace gases they could be entirely condensed at a temperature considerably higher than the melting point of the arsenic sulphides and could in such case be recovered in a molten state, and consequently easily tapped off from the condensing device. Since, however, a relatively large volume of non-condensible gases, such as carbon dioxide, carbon monoxide and nitrogen, are present in the furnace gases, the condensation and separation of the arsenic sulphides takes place at a much lower temperature, generally in the neighborhood of the melting point of the arsenic sulphides.

As a rule, the condensation begins at a temperature above the melting point of the arsenic sulphides, so that the material first condensing is obtained in a molten state. As the arsenic sulphides continue to condense, the dew point is lowered and the temperature of the gases must be lowered in order to effect complete condensation of the arsenic sulphides therein, and ultimately part of the arsenic sulphides are condensed at a temperature below the melting point and thus obtained in the solid state. In this way there is obtained during the condensation both liquid and solid arsenic sulphides forming together a semi-liquid viscous mass which adheres to the condensing surfaces of the condenser and can only be removed with considerable difficulty. In practice, this difficulty practically prevents continuous operation of the condensing equipment.

The present invention aims to ameliorate this difficulty so as to permit satisfactory and practically continuous operation of the condensing apparatus. To this end, the invention contemplates diluting the gas mixture containing sulphur and arsenic vapors with an inert or indifferent gas in such a quantity that no noteworthy condensation of arsenic sulphides takes place above the melting point of the arsenic sulphides. Such dilution should be made before the gas mixture has been cooled to a temperature at which any condensation of the arsenic sulphides will take place. Upon cooling the so diluted gas mixture, the condensed arsenic sulphides are obtained in the form of a fine powder which can readily be removed from the condensing apparatus.

In order to facilitate cooling of the gas mixture, it is advantageous that the diluting indifferent gas should have a comparatively low temperature, since the condensing apparatus can in such case be of smaller dimensions. A comparatively low temperature of the diluting gas effects a rapid cooling of the gas mixture containing the sulphur and arsenic vapors, which contributes to the condensation of the arsenic sulphides in the form of a fine powder. The temperature of the gas mixture after the introduction thereto of the indifferent diluting gas should preferably be lower than the condensation temperature of the arsenic sulphides in the gas mixture, and preferably below the melting temperature of the arsenic sulphides.

Any appropriate indifferent gas may be used for diluting the gas mixture. It will usually be found advantageous in practice to use as the diluting gas part of the non-condensible gas exiting from the condensing apparatus. Such non-condensible gas has already been cooled to a low temperature in the course of its passage through the condensing apparatus, but if desired it may be cooled to a lower temperature, as for example in an appropriate cooling device, before being introduced into the comparatively hot gas mixture containing the sulphur and arsenic vapors.

While the invention is particularly applicable to the condensation of arsenic sulphides from furnace gases obtained in the smelting of sulphide ores, the invention may be applied with advantage to any mixture of arsenic and sulphur vapors with non-condensible gases, as well as to gases consisting for the most part of sulphur and arsenic vapors where it is desired to obtain the condensed arsenic sulphides in the form of powder.

The powder of arsenic sulphides obtained by practice of the invention can be melted and cast, without access of air, in large blocks or other appropriate shapes, for convenience in transportation or storage. Such a melting operation has the further advantage that such arsenic trioxide as may have condensed with the arsenic sulphides is converted during melting into an arsenic sulphide with the evolution of sulpur dioxide, so that the molten material is substantially free from the poisonous arsenic trioxide. The arsenic sulphides are practically non-soluble and non-poisonous.

I claim:—

1. In the process of condensing sulphur and arsenic vapors, the step or steps of admixing with sulphur and arsenic vapors such a quantity of an indifferent diluting gas that no noteworthy condensation of the sulphur and arsenic vapors takes place at a temperature above the melting temperature of the condensed arsenic sulphides and cooling the vapors to condense the arsenic sulphide in the form of a powder.

2. The method of condensing sulphur and arsenic vapors from a considerably larger volume of non-condensible gas admixed therewith which comprises introducing into said gas mixture such a volume of an indifferent diluting gas that no noteworthy condensation of arsenic sulphide takes place above the melting temperature of the arsenic sulphide and cooling the vapors to condense the arsenic sulphide in the form of powder.

3. The method of condensing sulphur and arsenic vapors from a considerably larger volume of non-condensible gas admixed therewith which comprises introducing into said gas mixture such a volume of an indifferent diluting gas of such temperature that the temperature of the resulting gas mixture is not substantially higher than the condensation temperature of the arsenic sulphide therein and cooling the vapors to condense the arsenic sulphide in the form of powder.

4. In the method of claim 1, employing as the indifferent diluting gas part of the non-condensible gas exiting from the condensing apparatus.

5. In the method of claim 1, melting the condensed arsenic sulphide powder without access of air for converting any arsenic trioxide therein to arsenic sulphide.

6. The method of recovering arsenic from arsenic-bearing sulphide ores which comprises, treating the ore to produce elemental sulphur and arsenic which combine to form arsenic sulphide vapor, admixing with the vapor such a quantity of an indifferent diluting gas that no noteworthy condensation of said vapor takes place at a temperature above the melting temperature of the condensed arsenic sulphide, and cooling the vapor to condensate the arsenic sulphide in the form of powder.

In testimony whereof I have signed my name to this specification.

NILS ERIK LENANDER.